(12) United States Patent
Silventoinen et al.

(10) Patent No.: US 6,442,387 B1
(45) Date of Patent: Aug. 27, 2002

(54) METHOD OF ESTIMATING INTERFERENCE LEVEL IN A RADIO SYSTEM

(75) Inventors: Marko Silventoinen, Helsinki; Harri Posti, Oulu; Harri Jokinen, Hiisi, all of (FI); Jari Ryynänen, Fuzhou (CN); Jukka Suonvieri, Tampere (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/367,568

(22) PCT Filed: Feb. 20, 1998

(86) PCT No.: PCT/FI98/00156

§ 371 (c)(1),
(2), (4) Date: Feb. 9, 2000

(87) PCT Pub. No.: WO98/37646

PCT Pub. Date: Aug. 27, 1998

(30) Foreign Application Priority Data

Feb. 21, 1997 (FI) .................................................. 970754

(51) Int. Cl.[7] .................................................. H04Q 7/20
(52) U.S. Cl. ........................ 455/436; 455/437; 455/446; 455/67.1
(58) Field of Search ........................ 455/436, 437, 455/446, 439, 67.1, 427; 370/335; 342/457

(56) References Cited

U.S. PATENT DOCUMENTS

| 4,613,990 | A | * | 9/1986 | Halpern ....................... 455/33 |
|---|---|---|---|---|
| 5,307,510 | A | | 4/1994 | Gunmar et al. |
| 5,355,522 | A | | 10/1994 | Demange |
| 5,561,839 | A | | 10/1996 | Österberg et al. |
| 5,794,157 | A | * | 8/1998 | Haartsen ...................... 455/522 |
| 5,799,004 | A | * | 8/1998 | Keskitalo et al. ........... 370/335 |
| 5,799,243 | A | * | 8/1998 | Ojaniemi ...................... 455/63 |
| 5,893,033 | A | * | 4/1999 | Keskitalo et al. ........... 455/437 |
| 5,898,928 | A | * | 4/1999 | Karlsson et al. ............. 455/450 |
| 5,915,219 | A | * | 6/1999 | Poyhonen .................... 455/435 |
| 6,047,187 | A | * | 4/2000 | Haartsen ...................... 455/450 |
| 6,181,941 | B1 | * | 1/2001 | McCarthy ..................... 455/436 |

OTHER PUBLICATIONS

Copy of International Search Report for PCT/FI98/00156.

* cited by examiner

*Primary Examiner*—Edward F. Urban
*Assistant Examiner*—Marceau Milord
(74) *Attorney, Agent, or Firm*—Altera Law Group, LLC

(57) ABSTRACT

The invention relates to a method for estimating the interference level in a cellular radio system comprising in each cell a base station (100) in each cell, and a number of subscriber terminals (108 to 112) communicating with the base station. The terminals measure power levels from those frequencies which are on the list that is maintained by the terminal and comprised those base stations and frequencies to which the terminal can perform a handover. In the solution of the invention the list also comprises frequencies whose power level information is used for the frequency planning of the system. Frequency planning can thus be implemented without any separate means.

12 Claims, 1 Drawing Sheet

METHOD OF ESTIMATING INTERFERENCE LEVEL IN A RADIO SYSTEM

This application is a 371 of PCT/FR 98/00156, filed on Feb. 20, 1998.

FIELD OF THE INVENTION

The invention relates to a method for estimating the interference level in a cellular radio system comprising in each cell at least one base station, and a number of subscriber terminals communicating with one or several base stations, in which method the terminals measure power levels from those frequencies which are on a list that is maintained by the terminals and comprise those base stations and frequencies which allow a handover to be performed by the terminal.

DESCRIPTION OF THE RELATED ART

One of the most essential tasks in the radio system planning and maintenance is frequency planning, in which the resources available to a system are distributed to the different parts of the system. Frequency planning should be carried out with care, since it has a great influence on the capacity and the quality of the connections in the system.

In narrowband cellular radio systems, co-channel interference is one of the most significant factors restricting the system capacity. Co-channel interference means the interference of the signals transmitted at the same frequency in neighboring cells in a desired signal. Consequently, cellular radio systems have conventionally been designed to use the same frequency in cells which are at a sufficiently long distance from each other, whereby the interfering signals do not exceed the permissible limits due to the path attenuation of the signals. This results in a so-called frequency recurrence pattern in the cellular structure.

The estimation or measurement of interference levels is thus an essential part of frequency planning at each frequency. The frequency planning is performed in two steps: with the aid of computer simulation while the system is being set up and, on the other hand, with the aid of actual measurements when the system is already in use. Frequency planning is constantly needed since the systems develop and base stations are added or their locations are modified during the operating life of a system on account of increased traffic, for instance. When a system is in use, measurements have conventionally been performed by a separate measuring equipment arranged in a vehicle traveling in a target area.

A method in which the system itself provides for frequency planning is called Automatic Frequency Planning (AFP). The problem with AFP is gaining information about the actual interference conditions and the radio wave propagation on the frequency channels with no need to use costly, separate measuring arrangements and equipment.

BRIEF DESCRIPTION OF THE INVENTION

The object of the present invention is to implement a method for gaining information required in frequency planning without separate measuring arrangements.

This is achieved by the method described in the introduction, the method being characterized in that the list further comprises frequencies whose power level information is used for the frequency planning of the system.

The method of the invention has several advantages. It is easy to implement since it does not necessitate separate investments in equipment. The desired frequency channels easily provide sufficient information for the needs of the frequency planning. The gathering and transmission of information occurs smoothly without disturbing the normal telephone traffic.

BRIEF DESCRIPTION OF THE DRAWINGS

The invention will be described in closer detail with reference to the examples in accordance with the attached drawings, in which.

SUMMARY OF THE INVENTION

Figures 1, 2A, 2B:
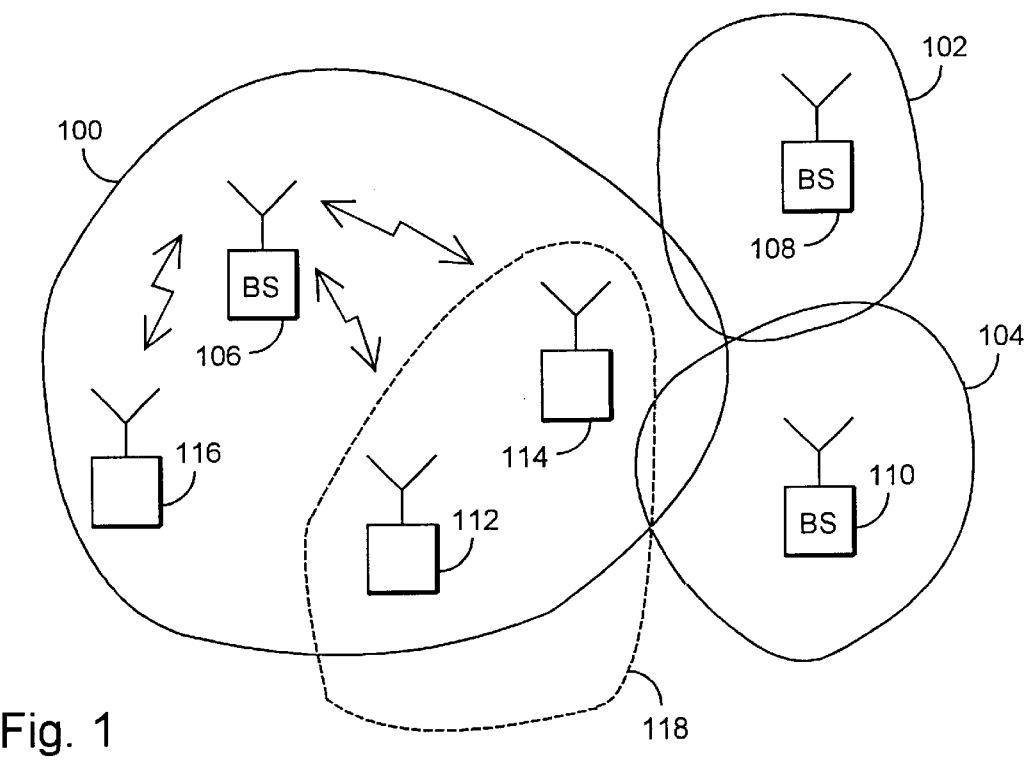
FIG. 1 shows a cellular radio system to which the method of the invention can be applied.
FIGS. 2a and 2b illustrate a measuring list maintained by a terminal.

The method of the invention can be applied to any radio system in which frequency planning is needed and in which terminals monitor nearby base stations as part of their normal operation. A radio system of this type is the digital GSM system.

Let us take a closer look at FIG. 1, illustrating a cellular radio system to which the method of the invention can be applied. The drawing shows a number of radio cells 100 to 104, each of which is served by one base station 106 to 110. The base stations thus communicate with the subscriber terminals in their area. In the figure terminals 112 to 116 are placed in cell 100 by way of example. The terminals and the base station communicate on a traffic channel, and the terminals simultaneously measure other channels and their power levels for handover. For example, terminal 114 is near the border between cells 100 and 104, and if it moves in the direction of cell 104 a handover to a frequency used in cell 104 has to be performed. For this purpose it thus already in advance measures the power level of the broadcast channel used in the cell to ensure that a potential handover can be performed at a proper time. Each base station thus transmits a particular broadcast channel, which is used as an aid in the handover.

Each terminal maintains a list comprising the broadcast-channel frequencies of those base stations to which the terminal can perform the handover and which frequencies the terminal thus measures. The list of the terminal is updated from time to time by the base station, depending on the measurement results and the location of the terminal.

In the solution of the invention the list maintained by the terminal also comprises frequencies whose power level information is used for the frequency planning of the system. Thus, besides frequencies monitored for the handover of the terminal, the list may comprise frequencies monitored for the frequency planning of the system, the frequencies thus being also measured by the terminal information can thus be obtained from every frequency needed.

Let us take another look at FIG. 1. Let us presume that there is a need to expand the system due to heavy traffic, for instance, by adding a new cell 118 which partly overlaps cell 100. Cell 100 can, of course, be cut down in size in connection with the replanning to ensure that the areas do not overlap. The base station 106 can now temporarily alter the measuring list of terminals 112 and 114 so that the terminals also measure frequencies desired to be used in the new cell.

Let us take a closer look at FIG. 2a, displaying a previous measuring list of terminal 112. The list comprises three frequencies $f_1$, $f_2$, $f_3$, which are broadcast channel frequencies used in the nearby base stations and which have been measured by terminal 112 for a potential handover. Since terminal 112 is in the area which is the area of the new cell 118 and which has the need to perform measurements for frequency planning, the system updates he measuring list of terminal 112 by means of base station 106 to correspond to FIG. 2b, whereby the list comprises not only the previous frequencies $f_1$, $f_2$, $f_3$, but also new frequencies $f_4$ and $f_5$, which are potential frequencies for the new cell.

The list maintained by the-terminal can be dynamically updated in connection with telephone calls for the frequencies measured for power level information. Alternatively, for the frequencies to be measured for power level information, the list can be updated at regular intervals, for instance once a day.

It is possible, of course, that the number of the frequencies measured for power level information varies as a function of time. In the measuring list, frequencies previously measured for handover can be replaced by frequencies measured for power level information, since the length of the measuring list is limited. To ensure that the handover stays reliable it is important, however, that the most significant potential target handover channels are represented in the list.

Technically, the updating of the measuring list for the frequencies measured for power level information is carried out in the same manner as for the frequencies measured for handover. It is obvious that when the terminal is on the move the measuring list is dynamically updated for these frequencies.

Similarly, the transferring of the measurement results to the base station is carried out in a known manner, as is done for the frequencies measured for handover.

In a preferred embodiment of the invention, when the list maintained by the terminal is updated for the frequencies measured for power level information, the location of each terminal is taken into account. Since the terminals are randomly located with respect to the base station, it is advantageous to measure different frequencies in different parts of the cell to obtain an applicable frequency spectrum. Interference levels may deviate from each other in different parts of the cell on account of the different frequencies of the neighboring cells on different sides of the cell. In frequency planning it is advantageous to know the actual interference situation of the terminals and the audibility of the terminals in the neighboring cells. With reference to FIG. 1, for example, terminals 114 and 116 in cell 100 can measure different frequencies. Thus the frequencies measured for the power level information vary in different terminals within the same cell. The list maintained by each terminal can comprise frequencies used by the terminal in the neighboring cell.

The location of the terminal can be defined in several manners. In a preferred embodiment the coverage areas of the neighboring base stations in the cell concerned are defined in advance. When the terminal reports its measurement results, the base station can conclude, on the basis of audibility information, the direction in which the terminal is. Alternatively, the location can be estimated with no advance information. The base station knows the direction in which each neighboring base station is. When the terminal reports its measurement results, the base station can conclude from the audibility information which base stations the terminal can receive, and thereby estimate the location of the terminal. The latter method is more inaccurate than the former one. Moreover, it is possible to use other methods known to those skilled in the art to define the location of the terminal.

In another preferred embodiment of the invention the desired frequencies are measured both before and after a new base station using frequencies chosen on the basis of the measurements is put to use. Measurements are performed both in the area of the new base station and in the area of the neighboring cells of the new base station. By comparing the results thus obtained it is possible to determine how successful the decisions made in frequency planning are in respect of the network quality. A control measurement can be performed controlled by the base station controller, either manually or automatically. The base station controller knows the neighboring cells of the new base station and it can automatically perform measurements in every nearby cell of the new base station.

In another preferred embodiment of the invention a new base station is mounted and its operation is commenced at a test frequency reserved for this purpose. It is thus possible to perform measurements in the target cell and the neighboring cells and subsequently choose the final frequencies on the basis the measurements. Thus the interference information is obtained as reliably as possible in the actual coverage area of the new base station, even before the new base station is put to use.

Measurements can also be performed in other than the actual neighboring cells, such as in those nearby cells in which the frequency to be introduced in the new cell is already in use.

Even though the invention has been described above with reference to the example illustrated in the accompanying drawings, it is to be understood that the invention is not restricted to it but can be modified in many ways within the scope of the inventive idea disclosed in the appended claims.

What is claimed is:

1. A method for estimating the interference level in a cellular radio system comprising:
   in each cell at least one base station, and a number of subscriber terminals communicating with one or several base stations, the terminals measure power levels from those frequencies which are on a list that is maintained by the terminals and comprise those base stations and frequencies which allow a handover to be performed by the terminal, wherein when the list maintained by the terminals are updated for the frequencies measured for power level information, a location of each terminal in the cell is taken into account, and wherein the list further comprising frequencies whose power level information is used for frequency planning of the system.

2. A method as claimed in claim 1, wherein for the frequencies measured for the power level information, the list maintained by the terminals are updated dynamically in connection with telephone calls.

3. A method as claimed in claim 1, wherein for the frequencies measured for the power level information, the list maintained by the terminals are updated at regular intervals.

4. A method as claimed in claim 1, wherein the number of the frequencies measured for the power level information varies as a function of time.

5. A method as claimed in claim 1, wherein the frequencies measured for the power level information vary in the different terminals within the same cell.

6. A method as claimed in claim 1, wherein the list comprises frequencies used in a neighbouring cell of the terminal.

7. A method as claimed in claim 1, wherein the list comprises broadcast channel frequencies of those base stations to which the terminals can perform a handover.

8. A method as claimed in claim 1, wherein the desired frequencies are measured both before and after a new base station using frequencies chosen on the basis of the measurements is put to use.

9. A method as claimed in claim 8, wherein the new base station is first put to use at a particular test frequency.

10. A method as claimed in claim 9, wherein the final frequencies to be used at the new base station are chosen on the basis of the measurements performed at the test frequency.

11. A method as claimed in claim 9, wherein measurements are performed both within the new base station and the neighboring cells of the new base station.

12. A method as claimed in claim 8, wherein measurements are performed both within the new base station and the neighbouring cells of the new base station.

* * * * *